United States Patent
Bonanni et al.

(10) Patent No.: US 9,668,116 B1
(45) Date of Patent: May 30, 2017

(54) MECHANISM TO TRANSMIT TEXT MESSAGES USING RING TIME

(71) Applicant: International Business Machines Corporation, Armonk, NY (US)

(72) Inventors: Cristina Bonanni, Rome (IT);
Alessandro Donatelli, Rome (IT);
Patrizia Manganelli, Rome (IT);
Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/986,749

(22) Filed: Jan. 4, 2016

(51) Int. Cl.
*H04W 4/00* (2009.01)
*H04W 4/14* (2009.01)
*H04L 15/08* (2006.01)
*H04M 3/02* (2006.01)
*H04W 24/08* (2009.01)
*H04W 88/02* (2009.01)

(52) U.S. Cl.
CPC ............... *H04W 4/14* (2013.01); *H04L 15/08* (2013.01); *H04M 3/02* (2013.01); *H04W 24/08* (2013.01); *H04W 88/02* (2013.01)

(58) Field of Classification Search
CPC ........... H04W 4/02; H04W 4/12; H04W 4/14; H04W 8/18; H04W 88/184; H04W 24/00; H04W 24/08; H04W 28/00; H04W 28/0284; H04W 28/0278; H04M 1/57; H04M 1/72519; H04M 1/72552; H04M 2207/18; H04M 19/04; H04M 19/041; H04M 19/047
USPC ........................... 455/466, 414.1, 567, 67.11
See application file for complete search history.

(56) References Cited

U.S. PATENT DOCUMENTS

| | | |
|---|---|---|
| 2004/0198471 A1 | 10/2004 | Deeds |
| 2006/0052095 A1 | 3/2006 | Vazvan |
| 2015/0256681 A1* | 9/2015 | Shaw ................. H04M 1/7255 379/88.22 |

FOREIGN PATENT DOCUMENTS

CN      101467464 A     6/2009

OTHER PUBLICATIONS

IBM, "Information transmission throught call duration signals," IP.com Electronic Publication: Nov. 9, 2005, IP.com No. 000131172, pp. 1-4.

(Continued)

*Primary Examiner* — Temica M Beamer
(74) *Attorney, Agent, or Firm* — Samuel A. Waldbaum

(57) ABSTRACT

A sender telephone receives a text message to send to a receiver telephone. The sender telephone determines the transmission delay time by sending a predetermined message to receiver telephone, based on the time it receives an address complete message and a release message. The sender telephone determines a constant value that is greater than the transmission delay time and in response to the determining the constant value, ringing the receiver telephone to transmit the received inputted text message. A receiver telephone receives a predetermined message from a caller telephone to determine a transmission delay time, based on the time it receives the address complete message and a release message. The receiver telephone determines a constant value that is greater than the transmission delay time. The receiver telephone receives incoming rings from the caller telephone and converts the received rings into a text message to be displayed.

25 Claims, 9 Drawing Sheets

(56) References Cited

OTHER PUBLICATIONS

International Telecommunication Union, "Series E: Overall Network Operation, Telephone Service, Service Operation and Human Factors," Telecommunication Standardization Sector of ITU, E.721 (May 1999), ITU-T Recommendation E.721—First issue 1998, May 1999, pp. 1-13.

* cited by examiner

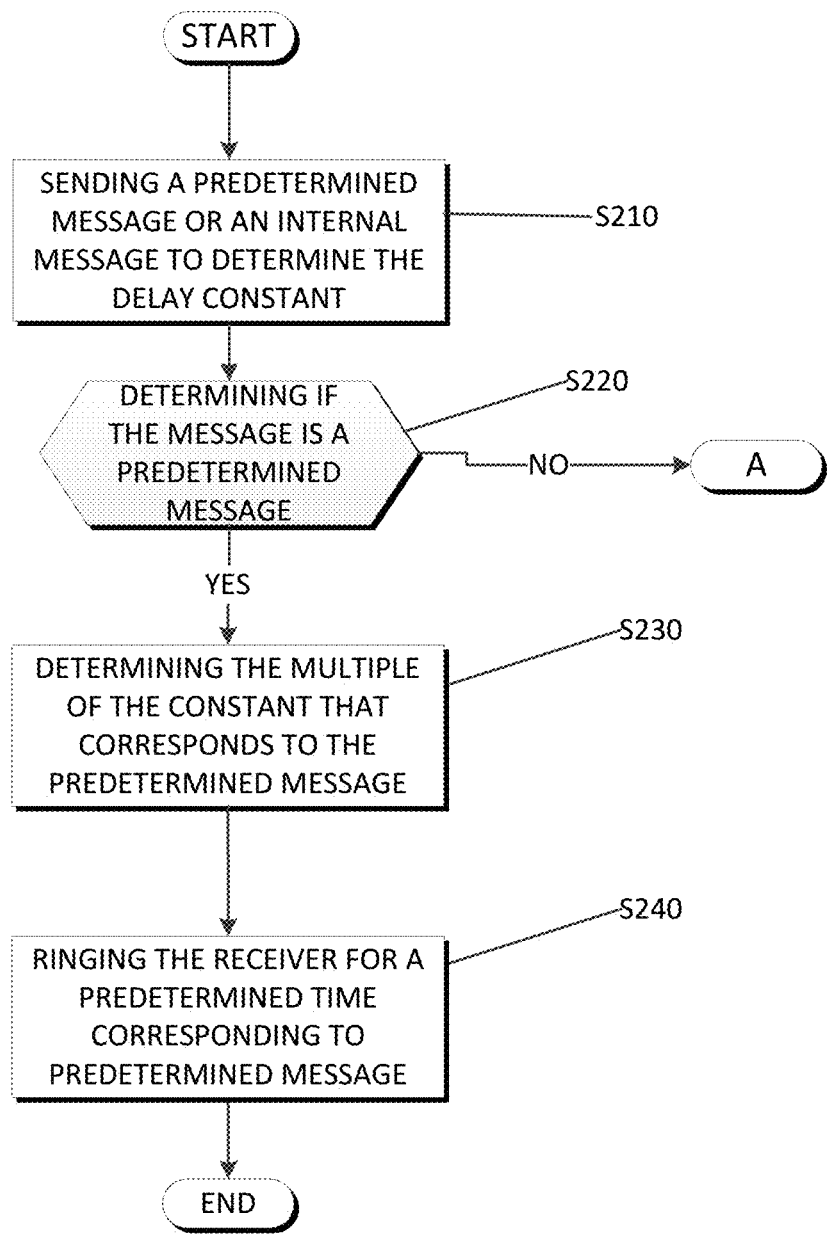

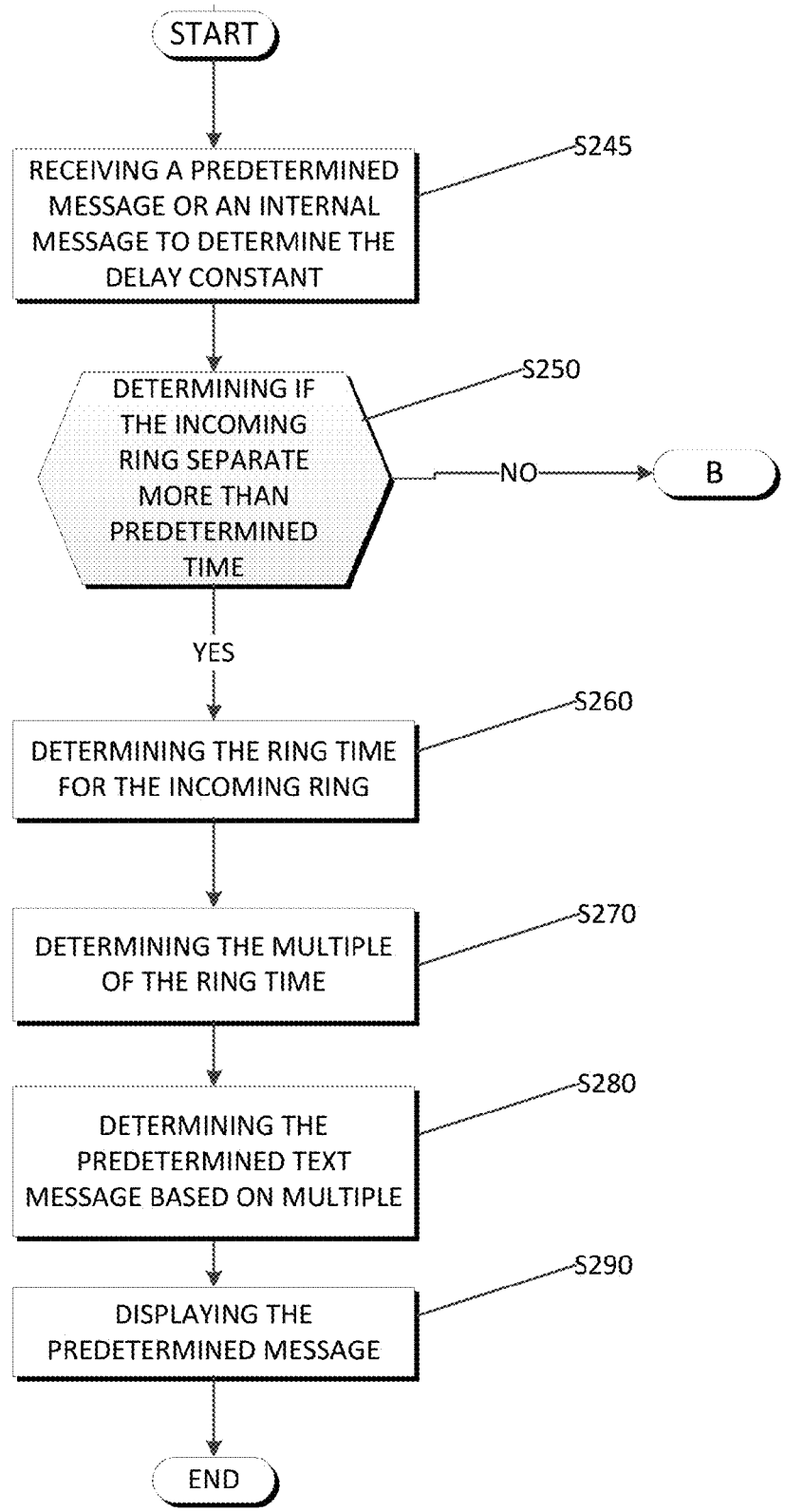

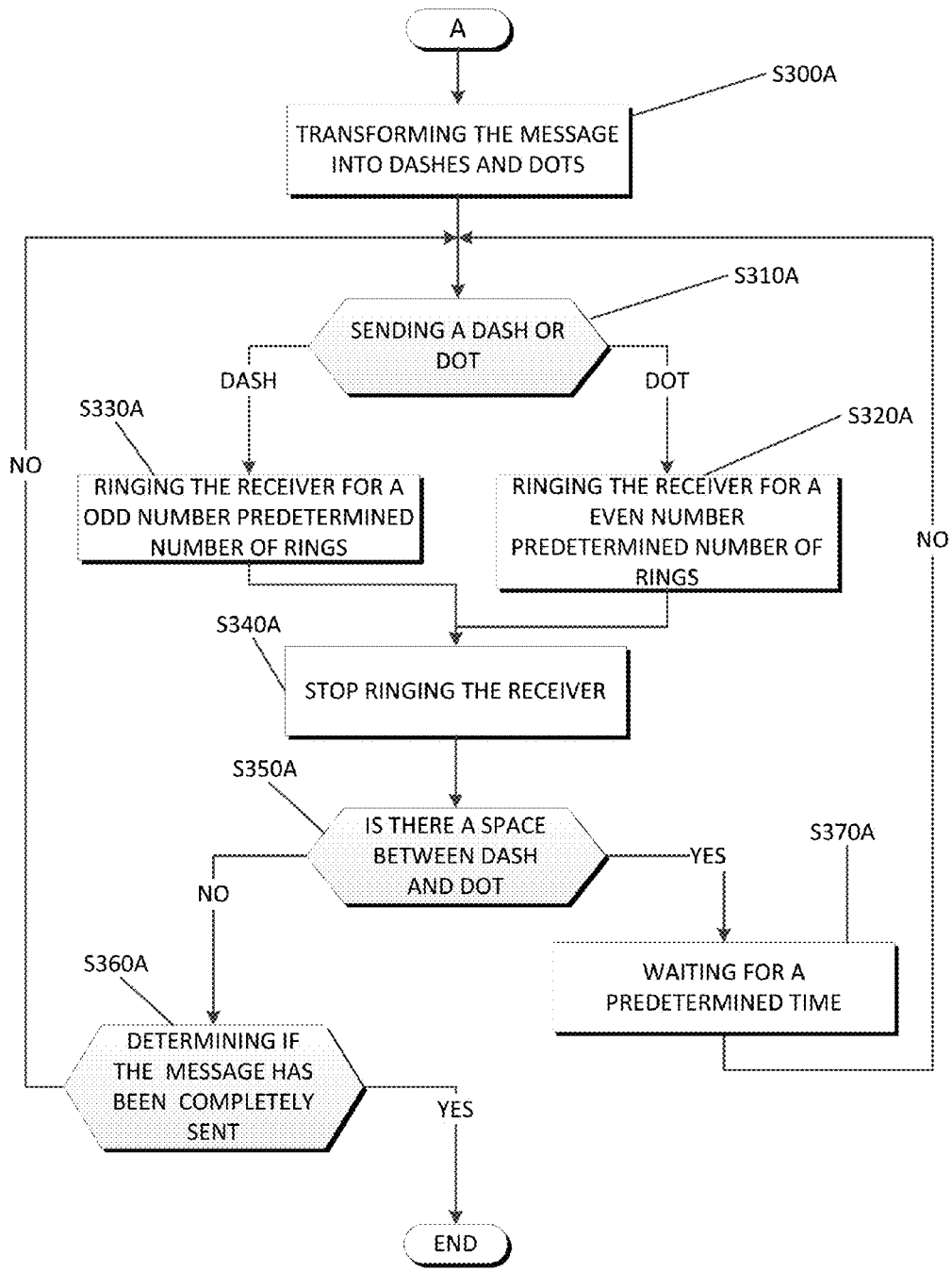

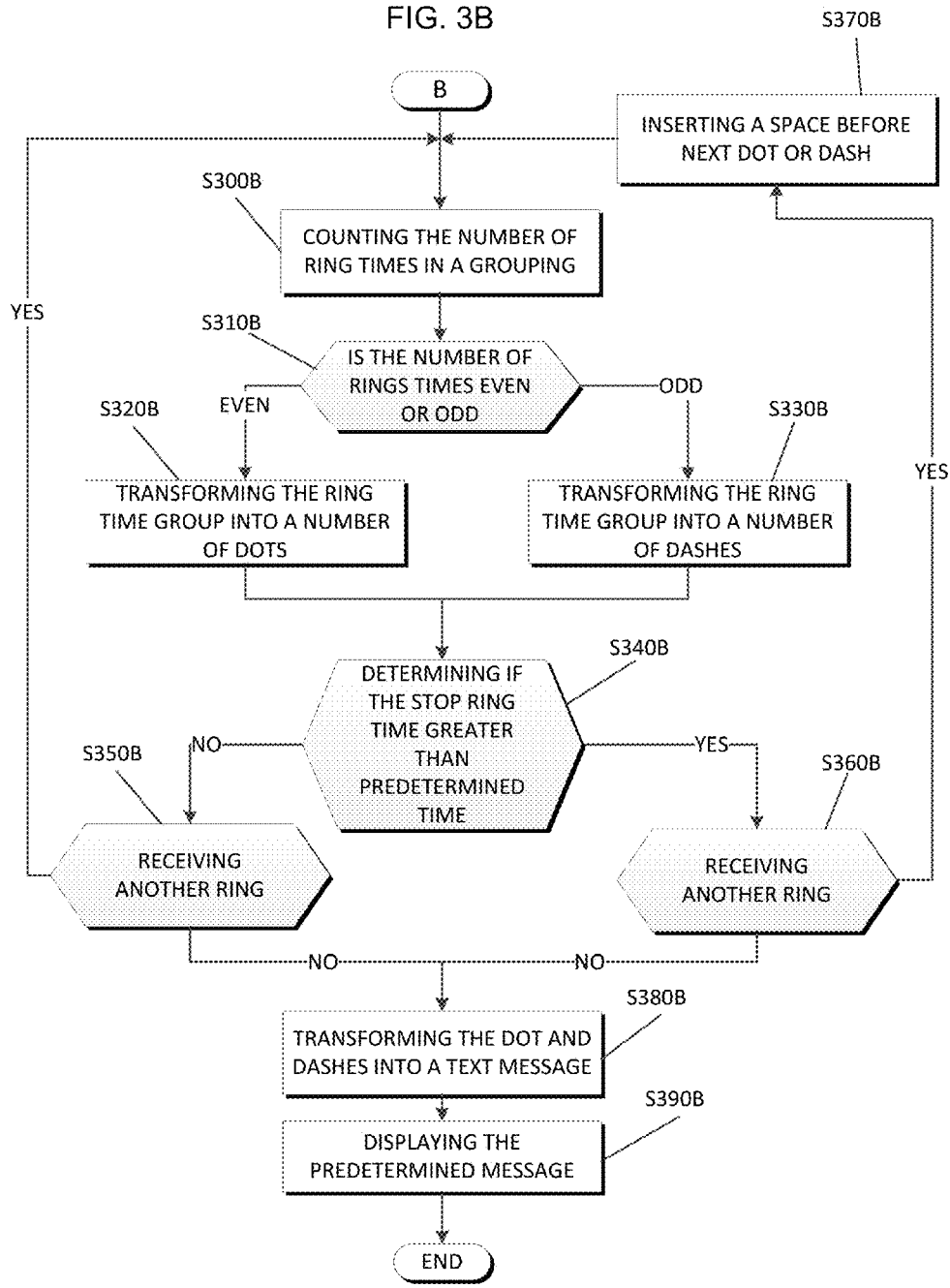

MECHANISM TO TRANSMIT TEXT MESSAGES USING RING TIME

BACKGROUND

The present invention relates to the field of signal transmission for a telephone or a telephone system, and more particularly to responsive to the continuation, cessation, or absence of an incoming audio signal to send a text message.

The use of the telephone line for the exchange of voice and data has increased exponentially. The development of communication requires continuous updates of the phone system to integrate the latest technologies with the greater availability of networks and to satisfy the users' expectation of faster connection speeds and higher reliability.

One example of communicating between telephones is by sending text messages between phones as an easy and effective way of exchanging information. A phone call requires the instantiation and the use of a dedicated line between the caller and receiver nodes even if the conversations are very short.

For short communications you can send messages such as, short messaging service (SMS), which allows one to avoid phone calls, but sending messages does not always ensure that the message reaches its destination in a reasonable amount of time. For example, when the SMS queues of the system are very long, which can cause a message delivery delay. In addition, the phone itself might not be able to send text messages.

An alternative system for fast communication because of the limited configuration of the phone, the unresponsive state of the messaging system or the phone line overloads.

BRIEF SUMMARY

Additional aspects and/or advantages will be set forth in part in the description which follows and, in part, will be apparent from the description, or may be learned by practice of the invention.

Embodiments of the present invention disclose a computer program product to send and receive a text message. A sender telephone receives a text message to send to a receiver telephone. The sender telephone determines the transmission delay time by sending a predetermined message to receiver telephone, based on the time it receives an address complete message and a release message. The sender telephone determines a constant value that is greater than the transmission delay time and in response to the determining the constant value, ringing the receiver telephone to transmit the received inputted text message. A receiver telephone receives a predetermined message from a caller telephone to determine a transmission delay time, based on the time it receives the address complete message and a release message. The receiver telephone determines a constant value that is greater than the transmission delay time. The receiver telephone receives incoming rings from the caller telephone and converts the received rings into a text message to be displayed.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 2A and 2B are flowcharts depicting operational steps to send and receive a predetermined text message using ring time within environment of FIG. 1, in accordance with an embodiment of the present invention.

FIGS. 3A and 3B are flowcharts depicting operational steps to send and receive an original text message using ring time within environment of FIG. 1, in accordance with an embodiment of the present invention.

DETAILED DESCRIPTION

Figure 1:
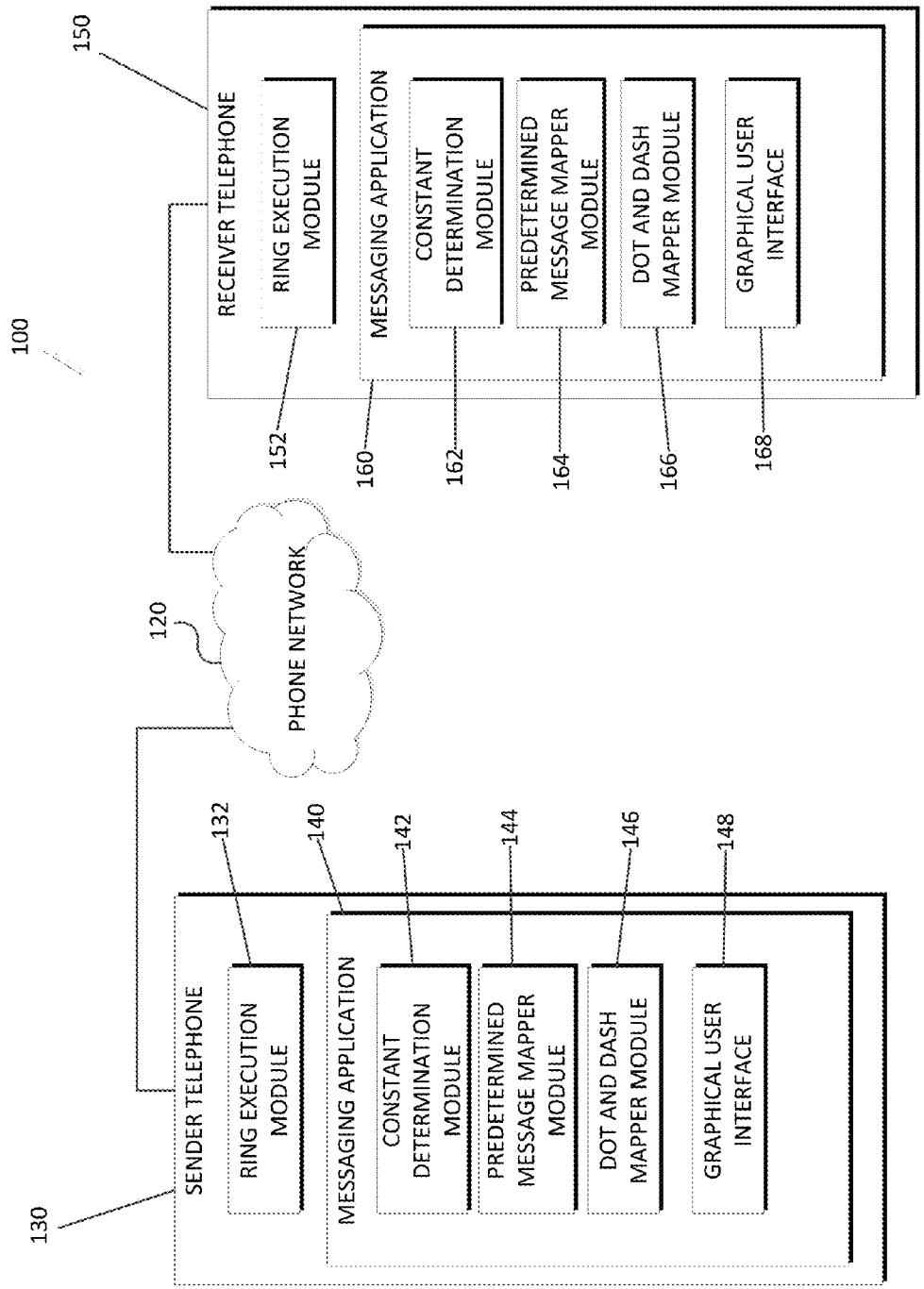
FIG. 1 is a functional block diagram illustrating a system for transmitting a text message, in accordance with an embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout.

Embodiments of the invention are generally directed to a system to transmit a text message using ring time. When a caller telephone sends a text message, the sender and the receiver phone establish what the transmission delay time is between the two telephones. Once the transmission delay time is established a constant time is chosen by both the sender and receiver telephones that is greater than the transmission delay time. To send a predetermined message, the sender rings the receiver for a predetermined ring time, such that, the length of the ring time is a multiple factor of the constant time. The receiver determines if the incoming ring is associated with a voice call or it is associated with receiving a text message. When receiving a text message the receiver telephone receives the rings from the caller, but does not active the ringer on the receiver phone. The receiver telephone divides the ring time by the constant to determine the multiple factor and which predetermined message the multiple factor is associate with. For sending an original message, the caller rings the receiver in a ring group, for example, a ring group is how many times it rings before a pause, in order to send dashes and/or dots based on the ring group. An odd number in the ring group indicates a dash and an even number in the ring group indicates a dot, and the number of rings that forms the ring group also indicates how many dashes or dots. The receiver translates the ring groups from the caller into a text message which it may display. The caller can further transmit the text message in hybrid fashion, meaning that the message is composed of predetermined messages and original messages.

FIG. 1 is a functional block diagram illustrating a system for transmitting a text message 100, in accordance with an embodiment of the present invention.

The system for transmitting a text message 100 requires a sender telephone, which is sending the text message, and a receiver telephone which receives the text message. The sender telephone is represented by the sender telephone 130 and the receiver telephone is represented by receiver telephone 150. However, sender telephone 130 or the receiver telephone 150 can be either the sender or the receiver based on if the telephone is receiving or sending a text message. For simplicity, the sender telephone 130 will be sending the text message, and the receiver telephone 150 will be receiving the text message, via phone network 120.

The sender telephone 130 allows for the user to enter text message to be sent and the messaging application 140 determines if the message is a predetermined message or an original message. The sender telephone 130 includes a ring execution module 132 and a messaging application 140. The sender telephone 130 may include internal and external hardware components, as depicted and described in further detail with respect to FIG. 5.

The receiver telephone 150 displays a received text message from the sender telephone 130. The receiver telephone 150 includes a ring execution module 152 and a messaging application 160. The receiver telephone 150 may include internal and external hardware components, as depicted and described in further detail with respect to FIG. 5.

The messaging applications 140 and 160 allow for text message to be sent and/or received. The messaging applications 140 and 160 each includes a constant determination module 142, 162, a predetermined message mapper module 144, 164, a dot and dash mapper module 146, 166, and a graphical user interface 148, 168.

The sender telephone 130 and the receiver telephone 150 each represents a telephonic computing device, for example a smartphone, that hosts message application 140 and 160 that includes a user interface, for example, a graphical user interface (GUI) 148 and 168 that allows a user to enter text message to be sent or view a received text message.

Figure 6:
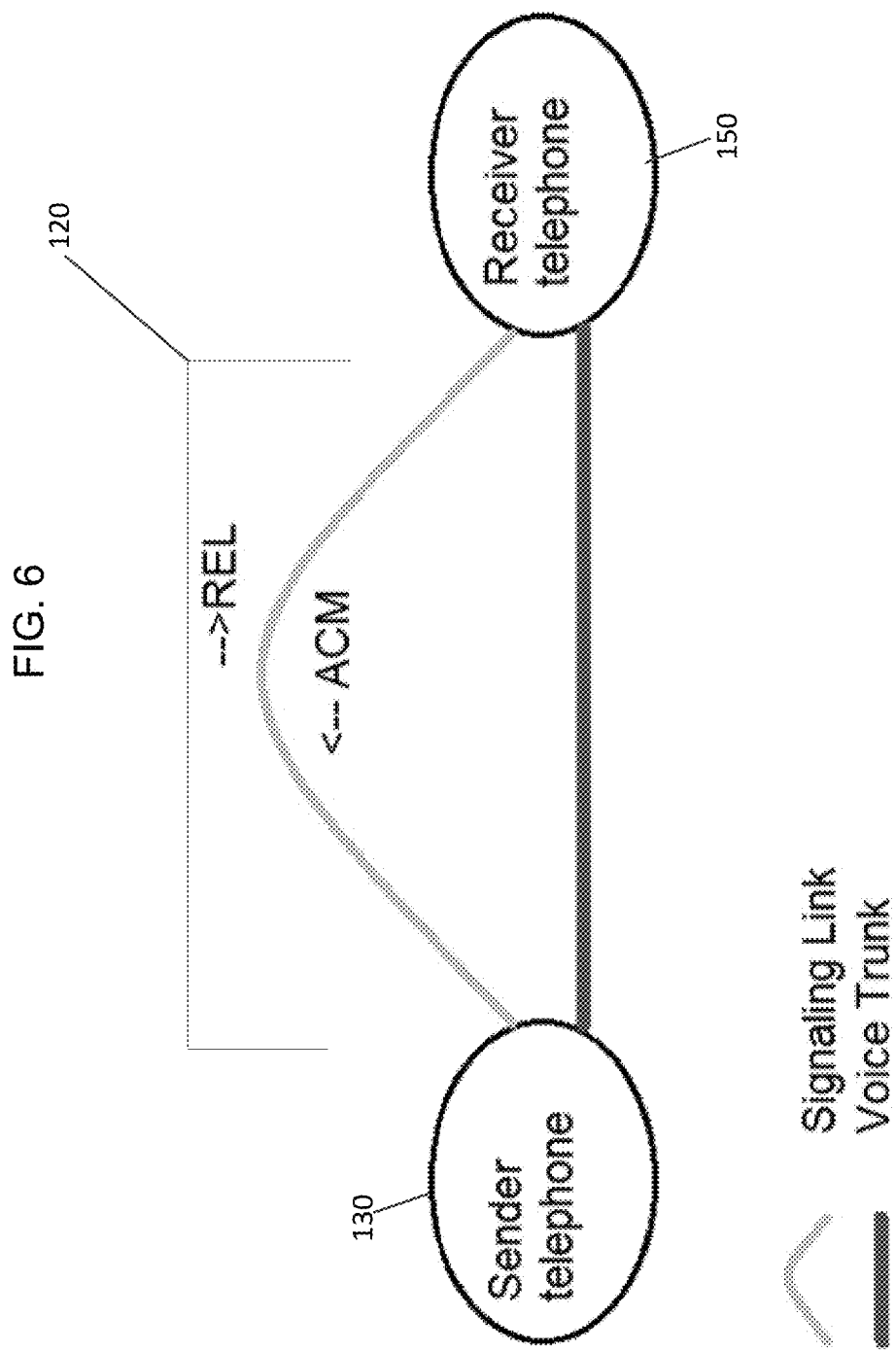
FIG. 6 is a functional block diagram illustrating how two telephones connect over the telephone network, in accordance with an embodiment of the present invention.

The ring execution module 132 rings the ring execution module 152 of the receiver telephone 150 to transmit the predetermined message or the original message composed of dots and/or dashes. However, there is a delay when the ring execution module 132 of the sender telephone 130 rings the ring execution module 152 of the receiver telephone 150 based on the Signaling System 7 (SS7) architecture, part of the Public Switched Telephone Network (PSTN) as well as part of the Personal Communication Services Network (PCN), which exchanges the information needed for a call over a separated digital channel by using signaling messages between the sender and receiver telephones 130 and 150. The transmission delay time can be determined from the address complete message (ACM) and the release (REL) message, as illustrated by FIG. 6. ACM is the message returned from the receiver phone 150 to the sender telephone 130 when the receiver telephone 150 is reached and the phone starts ringing, as illustrated by FIG. 6. ACM time is the time it took for the sender telephone 130 to receive the ACM message from the receiver telephone 150. The REL message is generated when the sender telephone 130 hangs up, which that interrupts the ring at the receiver telephone 150, as illustrated by FIG. 6. The REL time is the time it took for the receiver telephone 150 to receive REL message from the sender telephone 130. The transmission delay time is established by adding the ACM time and REL time together.

The constant determination module 142 sends a predetermined or internal message via the ring execution module 132 to the ring execution module 152 to establish what the transmission delay is, i.e. ACM+REL. The constant determination module 142 of the sender telephone 130 determines a constant time that is greater than the transmission delay time.

The ring execution module 152 of the receiver telephone 150 receives the predetermined or internal message from the ring execution module 132 and is able to establish the transmission delay is, i.e. ACM+REL. The constant determination module 162 of the receiver telephone 150 determines a predetermined constant time that is greater than the transmission delay time. The constant determination modules 142 and 162 determine same constant time.

A user enters a message into the GUI 148 and the message application 140 determines if the message is a predetermined message and/or an original message. A predetermined message can be common phrases, such as, "hello," "call me," "yes," "okay," "no," "busy," "bye," or something similar, such that, the predetermined messages are common messages that are sent between telephones. The predetermined message mapper module 144 comprises a data store of predetermined phrases or words and it associates a multiple factor with each of the predetermined phrases. The predetermined message mapper module 144 calculates the ring time, i.e. the length of one ring, based on the constant time multiplied by the multiple factor associated with the predetermined phrase. The predetermined message mapper module 144 has the ring execution module 132 ring the ring execution module 152 for a ring time equal to the constant multiplied by the multiple factor.

The ring execution module 152 of the receiver telephone 150 accepts the ring from the ring execution module 132 of the sender telephone 130 and message application 160 determines if ring is associated with a telephone call, a predetermined message, or an original message composed of ring groups that form dots and/or dashes. For example, the ring execution module 152 can determine if the ring is associated with a call or text message based on a length of waiting period between an initial ring it received and the subsequent ring it received. When the message application 160 determines it is receiving a predetermined message, then the ring execution module 152 determines the ring time, i.e. the length of time for the one ring. The predetermined message mapper module 164 receives the ring time from the ring execution module 152 and divides the ring time by the constant time to determine the multiple factor. The predetermined message mapper module 164 determines which of the predetermined stored phrases is associated with the multiple factor and sends the phrase to the GUI 168 to be displayed.

A predetermined phase, text or message is not always entered into the GUI 148 by a user. An original message can be entered into the GUI 148 and the dot and dash mapper module 146 converts the original message into string of dots and/or dashes that is to be transmitted to the receiver telephone 150. The dot and dash mapper module 146 converts the message using dots and/or dashes, for example, using Morse code. The dot and dash mapper module 146 would use odd number ring groups to transmit dashes, for example, a one ring group would represent one dash, a three ring group would represent a two dash group, or a combination of the odd ring groups can be used to give the desired number of dashes. The dot and dash mapper module 146 would use even number ring groups to transmit dots, for example, a two ring group would represent one dot, a four ring group would represent a two dot group.

The dot and dash mapper module 146 uses pauses, for example, a waiting period between rings times to show a separation in the ring groups or an insertion of a space between the groups. The time length of the pause would indicate if it is break between groups or a space, for example, the time length of the pause is below a threshold amount then the pause represents a break in the ring group and if the time length of the pause is greater than the threshold amount then the pause represents a space between words.

The ring execution module 152 receives the rings from the ring execution module 132 of the sender telephone 130. The ring execution module 152 counts the number of rings that form a ring group and the pauses between the rings. The dot and dash mapper module 166 interprets the number of rings that forms a ring group as being either a dash or dot, wherein an odd number ring group represents a dash and an even number ring group represents a dot. The dot and dash mapper module 166 determines the length of time for each pause to see the pause represents a break between groups or an insertion of a space. The dot and dash mapper module 166 converts the dashes, the dots and pause into a text message that is displayed by GUI 168.

FIGS. 2A and 2B are flowcharts depicting operational steps of the mechanism to send and receive a predetermined text message using ring time to send and receive a predetermined message within environment of FIG. 1, in accordance with an embodiment of the present invention.

FIG. 2A represents sending a predetermined message from the sender telephone 130 to the receiver telephone 150 and FIG. 2B represents the receiver telephone 150 receiving a predetermined message from the sender telephone 130.

FIG. 2A illustrates the steps for the sender of the text message. In one embodiment, a predetermined message is sent from the sender telephone 130 to the receiver telephone 150, when GUI 148 receives the inputted message and the constant determination module 142 determines a constant that is greater than a determined transmission time delay (S210). The message application 140 determines if the inputted message is a predetermined message or an original message (S220). If the inputted message is an original message then the dot and dash mapper module 146 converts the text into dot and dashes (S300A), which is illustrated by FIG. 3A. When the message application 140 determines that the message is a predetermined message, then the predetermined message mapper module 144 determines the multiple factor of the constant that corresponds to the predetermined text message (S230). The ring execution module 132 rings the receiver telephone 150 for the predetermined ring time corresponding to the multiple of the constant (S240).

FIG. 2B illustrates the steps for the receiver. The constant determination module 162 determines a constant that is greater than a determined transmission time delay (S245) and the ring execution module 152 determines if the incoming ring is separate more than a predetermined time (S250). If the time of the separation is less than a predetermined time then the incoming rings are treated as being an original message and the number of rings are counted (S300B), which is illustrated by FIG. 3B. When the time of the separation is more than a predetermined time, then the incoming ring is treated as a predetermined message. The ring execution module 152 determine the ring time, i.e. the time length of the incoming ring (S260), and the predetermined message mapper module 164 divides the ring time by the constant to determine the multiple factor (S270). The predetermined message mapper module 164 determines the predetermined texted message associated with the multiple factor (S280) and the GUI 168 displays the predetermined text message (S290).

FIGS. 3A and 3B are flowcharts depicting operational steps of the mechanism to send and receive an original text message using ring time to send and receive a message within environment of FIG. 1, in accordance with an embodiment of the present invention.

FIG. 3A illustrates the steps of sending an original text message. In one embodiment, a predetermined message is sent from the sender telephone 130 to the receiver telephone 150, when GUI 148 receives the inputted message and the constant determination module 142 determines a constant that is greater than a determined transmission time delay (S210). When the inputted message is an original message then the dot and dash mapper module 146 converts the text into dot and dashes (S300A). The ring execution module 132 transmits the dots and dashes to the receiver telephone 150 by ringing the receiver telephone 150 (S310A). The ring execution module 132 transmits a dash by ringing the receiver with odd ring group, meaning that the number of times the receiver phone rings is an odd number of times to transmit a number of dashes (S330A). The ring execution module 132 is able to transmit a dot by ringing the receiver with even ring group, meaning that the number of times the receiver phone rings is an even number of times to transmit a number of dots (S330A). The ring execution module 132 stops ring the receiver to indicate the end of the ring group (S340A). The dot and dash mapper module 146 determines if a space needs to be inserted after the previous ring group and/or if a new ring is needed after the previously sent ring group (S350A). When there is no space between ring groups the ring execution module 132 waits for a time period that is below a threshold value to indicate the start of a new ring group or that the message is complete (S360A). Then the steps repeat to transmit the next ring group to the receiver telephone 150. The ring execution module 132 waits for a period of time greater than a threshold period to indicate that there is a space in the message (S370A) before starting ringing the receiver telephone 150 for the next ring group.

FIG. 3B illustrates the steps of receiving an original text message. The constant determination module 162 determines a constant that is greater than a determined transmission time delay (S245) and the ring execution module 152 determines if the incoming ring is separate more than a predetermined time (S250). When the time of the separation is less than a predetermined time then the incoming rings are treated as being an original message and the number of rings are counted (S300B). The ring execution module 152 receives the rings from the ring execution module 132 of the sender telephone 130 and the ring execution module 152 counts how many times it receives a ring to form a ring group (S300B). The dot and dash mapper module 166 determines if the number of rings in the ring group is even or odd (S310B). When the number of rings in the ring group is even then the dot and dash mapper module 166 transform that group into a number of dots based on how many rings are in the group (S320B). When the number of rings in the ring group is odd then the dot and dash mapper module 166 transform the ring group into a number of dashes based on how many rings are in the ring group (S330B). The ring execution module 152 determines if there is a pause after receiving the previous ring group and the dot and dash mapper module 166 determines if the pause is greater than a threshold value (S340B). When the dot and dash mapper module 166 determines that the pause is less than the threshold value, and the dot and dash mapper module 166 determines if the ring execution module 152 is receiving another ring (S350B) then steps are repeated indicating a start of a new ring group and the steps are repeated (S350B and S300B). When the dot and dash mapper module 166 determines that the pause is greater than a threshold value and that another ring is being received (S360B), then the dot and dash mapper module 166 inserts a space in the message before the next dot or dash is inserted (S370B). When no more rings are being received then dot and dash mapper module 166 transforms the dot and dash message into a text message (S380B) and the GUI 168 displays the message (S390).

Figure 4A:
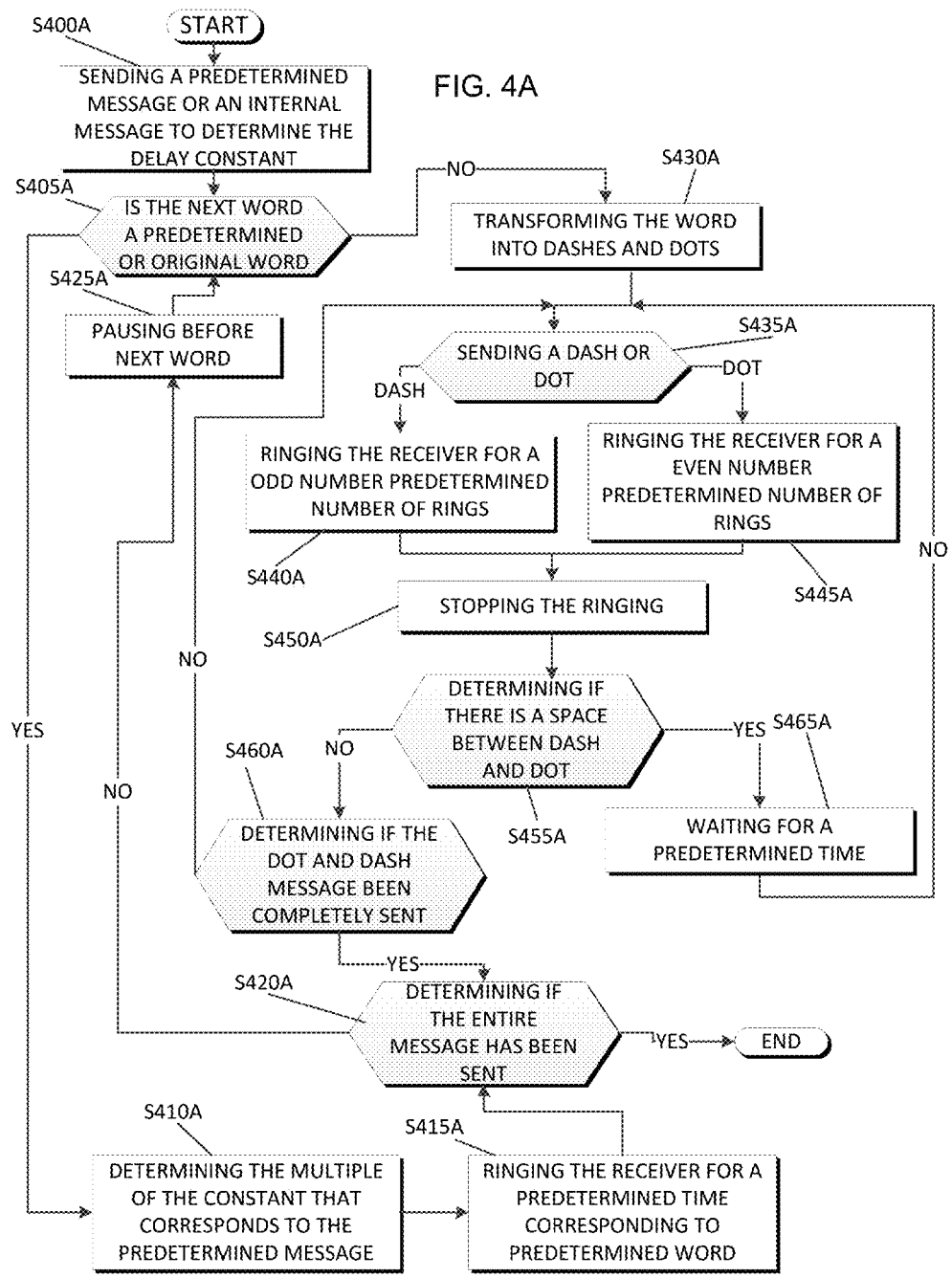
FIGS. 4A and 4B are flowcharts depicting operational steps to send and receive a hybrid text message using ring time within environment of FIG. 1, in accordance with an embodiment of the present invention.
Figure 4B:
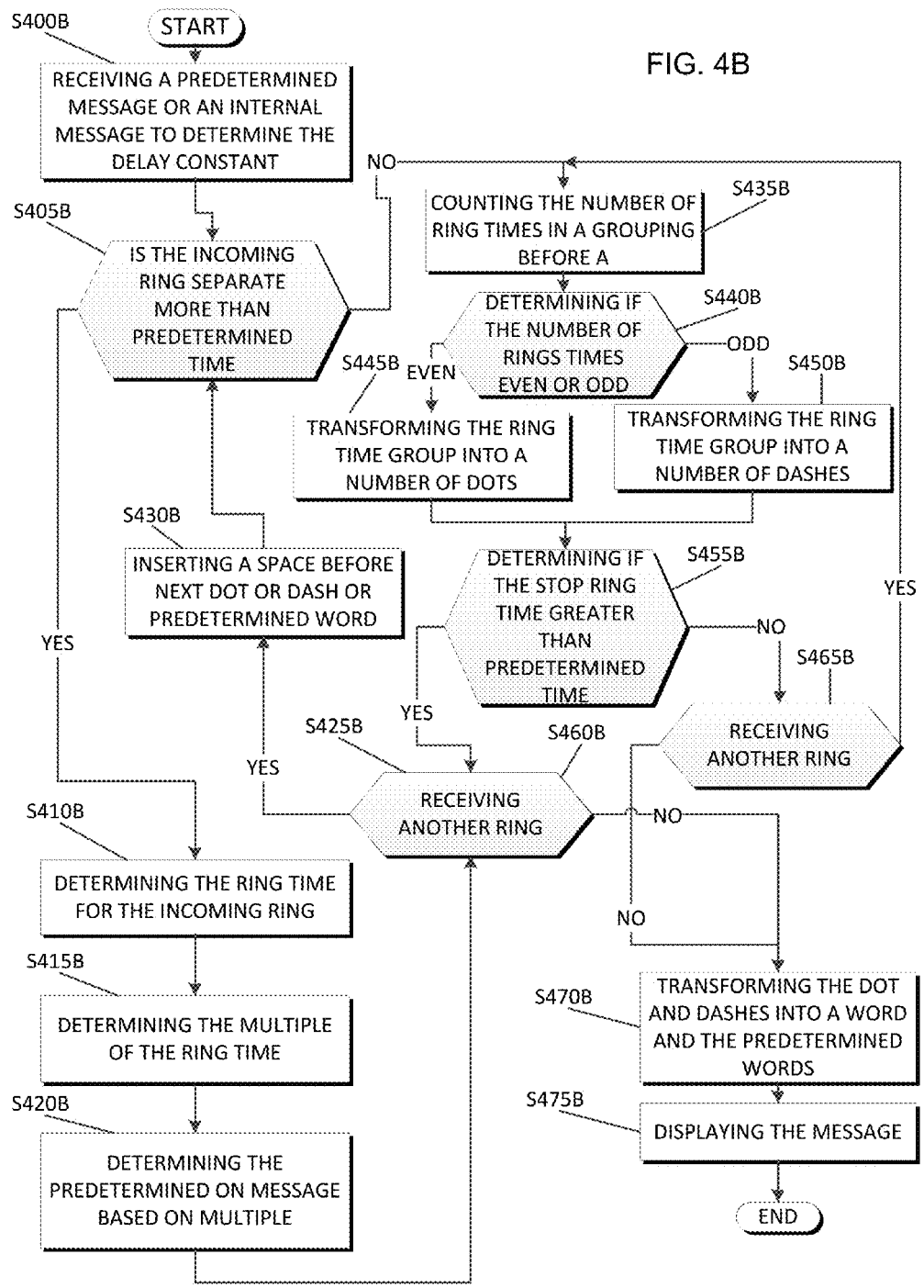

FIGS. 4A and 4B are flowcharts depicting operational steps of the mechanism to send and receive a text message using ring time to send and receive a hybrid message within environment of FIG. 1, in accordance with an embodiment of the present invention.

FIG. 4A illustrates the steps of sending a hybrid message composed of predetermined and original words. In one embodiment, a predetermined message for the sender telephone 130 is sent to the receiver telephone 150 when GUI 148 receives the inputted text message and the constant determination module 142 determines a constant that is greater than a determined transmission time delay (S400A). The message application 140 determines if the next word in the inputted text message is a predetermined word or an original word (S405A). When the word is a predetermined word, then the predetermined message mapper module 144 determines the multiple factor of the constant that corresponds to the predetermined word (S410A). The ring execution module 132 rings the receiver telephone 150 for the predetermined ring time, i.e. the length of time of ringing that corresponding to the multiple factor of the constant (S415A). The messaging application 140 determines if the text message has be completely sent (S420A) and when the message has not been completely sent then the ring execution module 132 waits for a period to insert a space after the previous word (S425A).

The message application 140 determines if the next word of the inputted text message is a predetermined word or an original word (S405A). When the inputted message is an original word then the dot and dash mapper module 146 converts the text into dots and/or dashes (S430A). The ring execution module 132 is able transmit the dots and/or dashes to the receiver telephone 150 by ringing the receiver telephone 150 (S435A). The ring execution module 132 is able to transmit a dash by ringing the receiver with odd ring group, meaning that the number of times the receiver phone rings is an odd number of times to transmit a number of dashes (S440A). The ring execution module 132 is able to transmit a dot by ringing the receiver with even ring group, meaning that the number of times the receiver phone rings is an even number of times to transmit a number of dots (S445A). The ring execution module 132 stops ring the receiver to indicate the end of the ring group (S450A) and the dot and dash mapper module 146 determines if a space needs to be inserted before the next word or if a new ring group is needed after the previously sent ring group (S455A). When there is no space between the ring groups then the ring execution module 132 waits for a time period that is below a threshold value to indicate the start of a new ring group or that the message is complete (S465A). Then the steps are repeated to transmit the next ring group to the receiver telephone 150. The messaging application 140 determines if the text message has been completely sent (S420A) and the ring execution module 132 waits for a period to insert a space after the previous word (S425A) before the steps are repeated. When the message has been completely sent then the ring execution module 132 ends the call.

FIG. 4B illustrates the steps of receiving a hybrid message composed of predetermined and original words. The constant determination module 162 determines a constant that is greater than a determined transmission time delay (S400B) and the ring execution module 152 determines if the incoming ring is separate more than a predetermined time (S405B). When the time of the separation is more than a predetermined time, then the incoming ring is treated as a predetermined word. The ring execution module 152 determine the ring time, i.e. the time length of the incoming ring (S410B), and the predetermined message mapper module 164 divides the ring time by the constant to determine the multiple factor (S415B). The predetermined message mapper module 164 determines the predetermined word associated with the multiple factor (S420B). The ring execution module 152 determines if it is receiving another ring from the same number (S425B) and when it does receive another ring then the message application 160 inserts a space after the previously received word (S430B).

The ring execution module 152 determines if the incoming ring is separate more than a predetermined time (S405B). When the time of the separation is less than a predetermined time then the incoming rings are treated as being an original word and the number of rings are counted to form a ring group (S435B). The ring execution module 152 receives the rings from the ring execution module 132 of the sender telephone 130 and the ring execution module 152 counts how many times it receives a ring to form a ring group (S435B). The dot and dash mapper module 166 determines if the number of rings in the ring group is even or odd (S440B). When the number of rings in the ring group is even then the dot and dash mapper module 166 transform that group into a number of dots based on how many rings are in the ring group (S445B). When the number of rings in the ring group is odd then the dot and dash mapper module 166 transform that group into a number of dashes based on how many rings are in the ring group (S450B). When the dot and dash mapper module 166 determines that the pause is greater than the threshold value (S455B), then the dot and dash mapper module 166 determines if the ring execution module 152 is receiving another ring or not (S425B) and when it does receive another ring then the message application 160 inserts a space after the previously received word (S430B) and the steps are repeated. When the dot and dash mapper module 166 determines that the pause is less than a threshold value and that another ring is being received from the same telephone, then the message application 160 determines that new ring group is being received (S465B) and the steps are repeated (S435B). When no more rings are being received by the ring execution module 152, then the dot and dash mapper module 166 transforms the dots and/or dashes into a text message (S470B) and the GUI 168 displays the predetermined words and the original words that form the text message (S475B).

Figure 5:
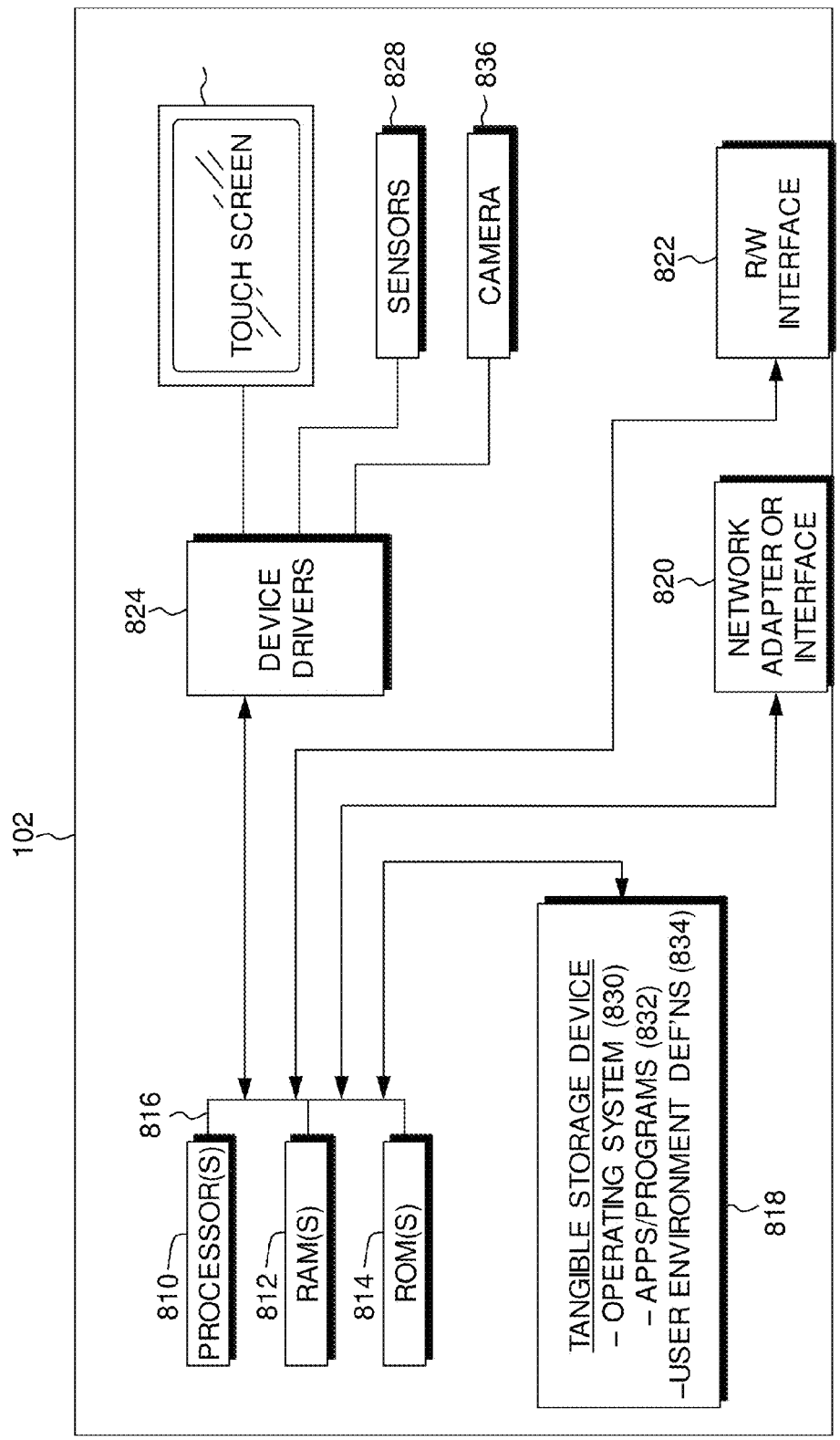
FIG. 5 is a block diagram of components of a telephonic device of mechanism to signal text message using ring time of FIG. 1, in accordance with embodiments of the present invention.

FIG. 5 is a block diagram of components of the sender and receiver telephones 130 and 150 represented by telephone computing device 102 for invoking a user environment based on a device cover, in accordance with an embodiment of the present invention. In an exemplary embodiment, telephone computing device 102 includes one or more processors 810, one or more computer-readable RAMs 812, one or more computer-readable ROMs 814, and one or more computer-readable tangible storage devices 818 on one or more buses 816. One or more operating systems 830, one or more apps or programs 832, for example, message applications 140 and 160, and one or more user environment definitions 834 are stored on the one or more computer-readable tangible storage devices 818 for execution by one or more of the processors 810 via one or more of the RAMs 812 (which typically include cache memory). In the illustrated embodiment, each of the computer-readable tangible storage devices 818 is a semiconductor storage device such as ROM 814, EPROM, flash memory or any other computer-readable tangible storage device that can store a computer program and digital information. Alternatively, each of the computer-readable tangible storage devices 818 is a magnetic disk storage device of an internal hard drive.

Telephone computing device 102 also includes a read/write (R/W) interface 822, for example, a USB port, to read from and write to external computing devices or one or more portable computer-readable tangible storage devices such as a CD-ROM, DVD, memory stick, magnetic disk, optical disk or semiconductor storage device. The apps and programs 832 and the user environment definitions 834 can be stored on the external computing devices or one or more of the portable computer-readable tangible storage devices, read via the R/W interface 822 and loaded onto the computer-readable tangible storage device 818.

Telephone computing device 102 also includes a network adapter or interface 820, such as a TCP/IP adapter card or wireless communication adapter (such as a 4G wireless communication adapter using OFDMA technology). The apps and programs 832 and the user environment definitions 834 can be downloaded to telephone computing device 102 from an external computer or external storage device via a network (for example, the Internet, a local area network, a wide area network, or a wireless network) and network adapter or interface 820. From the network adapter or interface 820, the apps and programs 832 and the user environment definitions 834 are loaded into computer-readable tangible storage device 818. The network may comprise copper wires, optical fibers, wireless transmission, routers, firewalls, switches, gateway computers and/or edge servers.

Telephone computing device 102 also includes a touch screen 826, a camera 836, sensors 828, for example, touch screen sensors and magnetically sensitive circuits, and device drivers 824 to interface to touch screen 826 for imaging, to sensors 828 for pressure sensing of alphanumeric character entry and user selections and for detecting magnetic flux and polarity. The device drivers 824, R/W interface 822 and network adapter or interface 820 comprise hardware and software (stored in computer-readable tangible storage device 818 and/or ROM 814).

It should be appreciated that FIG. 5 provides only an illustration of one implementation and does not imply any limitations with regard to the environments in which different embodiments may be implemented. Many modifications to the depicted environment may be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method and program product have been disclosed for selecting a user environment based on a device cover. However, numerous modifications and substitutions can be made without deviating from the scope of the present invention. Therefore, the present invention has been disclosed by way of example and not limitation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A computer program product for transmitting and receiving a text message, the computer program product comprising:
   one or more non-transitory computer-readable storage media and program instructions stored on the one or more non-transitory computer-readable storage media,
   the program instructions for transmitting a text message at a caller telephone comprising:
       receiving an inputted text message;
       transmitting a predetermined message to a receiver telephone to determine a transmission delay time, based on a time the caller telephone receives an address complete message and a release message;
       determining a constant value that is greater than the transmission delay time; and
       in response to the determining the constant value, ringing the receiver telephone to transmit the received inputted text message;
   the program instructions for receiving the inputted text message at the receiver telephone comprising:
       receiving the predetermined message from the caller telephone to determine the transmission delay time, based on a time the receiver telephone receives the address complete message and the release message;
       determining the constant value that is greater than the transmission delay time;
       receiving an incoming ring from the caller telephone and converting the received ring into a text message, wherein the text message is the inputted message; and
       displaying the text message.

2. The computer program product of claim 1, wherein the program instructions for transmitting the text message comprises:
   determining if the received inputted text message is a predetermined message, an original message or a hybrid message that includes a predetermined message and an original message.

3. The computer program product of claim 2, wherein the received inputted message is determined to be a predetermined message, the program instruction further comprise:

determining a multiple factor that corresponds to the predetermined message;
determining a ring time based on the constant value being multiplied by the multiple factor; and
ringing the receiver telephone one time equal to a length of time based on the determined ring time.

4. The computer program product of claim 2, wherein the received inputted message is determined to be an original message, the program instruction further comprise:
transforming the received inputted message into a message composed of dots and/or dashes to form a transmission string;
breaking up the transmission string into ring groups, such that each ring group is determined by the number of times the receiver telephone would ring; and
wherein the number of rings that form the ring group determine if and how many dots or dashes are transmitted.

5. The computer program product of claim 4, wherein the number of rings that form the ring group determine if and how many dots or dashes are transmitted, further comprises:
wherein when the ring group comprises an even number of rings then a dot is being transmitted, wherein the number of dots that are transmitted is determined by the number of rings that form the ring group; and
wherein when the ring group comprises an odd number of rings then a dash is being transmitted, wherein the number of dashes that are transmitted is determined by the number of rings that form the ring group.

6. The computer program product of claim 5, wherein breaking up the transmission string into ring groups, further comprises:
determining a waiting period between ring groups that is below a threshold value to indicate a start of a new ring group to the receiving telephone; and
determining a waiting period between ring groups that is above a threshold value to indicate a space to the receiver.

7. The computer program product of claim 6, wherein ringing the receiver telephone to transmit the received inputted text message, further comprises;
ringing the receiver telephone number of times to transmit the determined ring groups and spaces that form the transmission string.

8. The computer program product of claim 2, wherein the received inputted message is determined to be a hybrid message, the program instruction further comprise:
determining which words of the hybrid message are a predetermined message and which words are an original message.

9. The computer program product of claim 8, wherein the words of the hybrid message determined to be a predetermined message, the program instruction further comprise:
determining a multiple factor that corresponds to the predetermined message; and
determining a ring time based on the constant value being multiplied by the multiple factor.

10. The computer program product of claim 9, wherein the words of the hybrid message determined to be an original message, the program instruction further comprise:
transforming the original message into a message composed of dots and/or dashes to form a transmission string.

11. The computer program product of claim 10, wherein the transforming the received inputted message into a message composed of dots and/or dashes, comprises:
breaking up the transmission string into ring groups, such that each ring group is determined by the number of times the receiver telephone would rings;
wherein the number of rings that form the ring group determine if and how many dots or dashes are transmitted.

12. The computer program product of claim 11, wherein the number of rings that form the ring group determine if and how many dots or dashes are transmitted, further comprises:
wherein when the ring group comprises an even number of rings then a dot is being transmitted, wherein the number of dots that are transmitted is determined by the number of rings that form the ring group; and
wherein when the ring group comprises an odd number of rings then a dash is being transmitted, wherein the number of dashes that are transmitted is determined by the number of rings that form the ring group.

13. The computer program product of claim 12, wherein the breaking up the transmission string into ring groups, further comprises:
determining a waiting period between ring groups that is below a threshold value to indicate a start of a new ring group to the receiving telephone; and
determining a waiting period between ring groups that is above a threshold value to indicate a space to the receiver.

14. The computer program product of claim 13, wherein ringing the receiver telephone to transmit the received inputted text message, further comprises;
ringing the receiver telephone one time equal to a length of time based on the determined ring time to transmit the predetermined message; and
ringing the receiver telephone number of times to transmit the determined ring groups and spaces that form the transmission string.

15. The computer program product of claim 1, wherein the program instructions for receiving the text message comprises:
determining if the received rings from a caller telephone is transmitting a predetermined message, an original message or a hybrid message that includes a predetermined message and an original message.

16. The computer program product of claim 15, wherein the incoming rings was determined to be a receiving a predetermined message, the program instructions further comprise:
determining a ring time length for the incoming ring and dividing the ring time by the constant value to determine a multiple factor; and
determining the predetermine message associated with the multiple factor;
wherein the displayed text message is the predetermined message.

17. The computer program product of claim 15, wherein the incoming rings was determined to be a receiving an original message, the program instructions further comprise:
counting the number of rings received before a pause in receiving the rings to form a ring group;
determining if the time length of the pause is greater than or less than a threshold value; and
determining if the number of rings is an odd or an even number;
wherein when the ring group comprises an even number of rings then a dot is being received, wherein the number of dots that are received is determined by the number of rings that form the ring group; and wherein when the ring group comprises an odd number of rings then a dash is being received, wherein the number of dashes that are received is determined by the number of rings that form the ring group.

18. The computer program product of claim 17, wherein determining if the time length of the pause is greater than or less than a threshold value, comprises:
   determining if the pause is below a threshold value to indicate a start of a new ring group;
   determining the pause is above a threshold value to indicate a space is to be inserted in the ring groups;
   forming a transmission string that includes dots, dashes and spaces determined from the ring groups and pauses;
   transforming the transmission string into a text message; and
   displaying the text message.

19. The computer program product of claim 15, wherein the incoming rings was determined to be a receiving a hybrid message, the program instructions further comprise:
   determining from a pause in the incoming rings if the next incoming rings is transmitting a predetermined message or an original message.

20. The computer program product of claim 19, wherein the next incoming rings was determined to be a predetermined message, the program instructions further comprise:
   determining a ring time length for the incoming ring and dividing the ring time by the constant value to determine a multiple factor; and
   determining the predetermine message associated with the multiple factor.

21. The computer program product of claim 20, wherein the next incoming rings was determined to be an original message, the program instructions further comprise:
   counting the number of rings received before a pause in receiving the rings to form a ring group; and
   determining if the time length of the pause is greater than or less than a threshold value.

22. The computer program product of claim 21, wherein counting the number of rings that form the ring group, further comprises:
   determining if the number of rings is an odd or an even number;
   wherein when the ring group comprises an even number of rings then a dot is being received, wherein the number of dots that are received is determined by the number of rings that form the ring group; and
   wherein when the ring group comprises an odd number of rings then a dash is being received, wherein the number of dashes that are received is determined by the number of rings that form the ring group.

23. The computer program product of claim 22, wherein determining if the time length of the pause is greater than or less than a threshold value, further comprises:
   determining if the pause is below a threshold value to indicate a start of a new ring group; and
   determining the pause is above a threshold value to indicate a space is to be inserted in the ring groups.

24. The computer program product of claim 23, the program instructions further comprises:
   forming a transmission string that includes dots, dashes and spaces determined from the ring groups and pauses;
   transforming the transmission string into a text message.

25. The computer program product of claim 24, wherein displaying the text message, comprises:
   combining the predetermined messages, the original message and the space to form the text message;
   displaying the combined message that forms the text message.

* * * * *